(12) United States Patent
Denne

(10) Patent No.: US 6,462,439 B1
(45) Date of Patent: Oct. 8, 2002

(54) ELECTROMAGNETIC APPARATUS FOR PRODUCING LINEAR MOTION

(75) Inventor: Phillip Raymond Michael Denne, Bournemouth (GB)

(73) Assignee: Advanced Motion Technologies LLC, Rockville, MD (US)

(*) Notice: Subject to any disclaimer, the term of this patent is extended or adjusted under 35 U.S.C. 154(b) by 0 days.

(21) Appl. No.: 09/529,692

(22) PCT Filed: Oct. 15, 1998

(86) PCT No.: PCT/GB98/03092

§ 371 (c)(1), (2), (4) Date: Jun. 23, 2000

(87) PCT Pub. No.: WO99/19973

PCT Pub. Date: Apr. 22, 1999

(30) Foreign Application Priority Data

Oct. 15, 1997 (GB) ................................................ 9721747

(51) Int. Cl.[7] ............................................. H02K 33/00
(52) U.S. Cl. .................................. 310/17; 60/520; 62/6
(58) Field of Search ............................ 310/12, 13, 14, 310/15, 17, 23, 30, 34; 417/412; 60/520; 62/6

(56) References Cited

U.S. PATENT DOCUMENTS

| | | | | | |
|---|---|---|---|---|---|
| 4,015,915 A | * | 4/1977 | Hardman | ...................... | 417/490 |
| 4,281,263 A | * | 7/1981 | Virolleau et al. | .............. | 310/13 |
| 4,439,698 A | * | 3/1984 | Chen | ............................ | 310/12 |
| 4,541,787 A | * | 9/1985 | DeLong | ....................... | 417/417 |
| 4,965,864 A | * | 10/1990 | Roth et al. | ................... | 318/135 |
| 5,096,011 A | * | 3/1992 | Oslapas | ....................... | 180/412 |
| 5,166,563 A | * | 11/1992 | Bassine | ........................ | 310/15 |
| 6,012,910 A | * | 1/2000 | McNaull | ...................... | 417/412 |

FOREIGN PATENT DOCUMENTS

| | | | |
|---|---|---|---|
| EP | 0457389 | * | 11/1991 |
| GB | 645281 | * | 10/1950 |
| GB | 2017420 | * | 10/1979 |

* cited by examiner

*Primary Examiner*—Nestor Ramirez
*Assistant Examiner*—Judson H. Jones
(74) *Attorney, Agent, or Firm*—Darby & Darby

(57) ABSTRACT

Electromagnetic apparatus for producing an axially directed force comprising a stator having a plurality of axially spaced coils around a working volume within which an armature in the form of a free piston is axially displaceable, the armature having means for producing a magnetic field a substantially radially directed part of which intersects at least some of the coils of the stator such that a resultant axially directed force is generated when a current flows in the coils.

8 Claims, 3 Drawing Sheets

ELECTROMAGNETIC APPARATUS FOR PRODUCING LINEAR MOTION

The present invention relates to electromagnetic apparatus for producing linear motion. A number of designs of linear electromagnetic actuator, sometimes termed a linear motor, have been produced. Various linear motor configurations are described in WO93/01646. The devices to which this prior art relates have axial symmetry and are formed as piston-in-cylinder machines. The principal advantage of axial symmetry lies in the fact that the strong attractive forces between the magnetic elements of the stator and the magnetic elements of the armature are balanced about a central axis, so that the bearings of the machine do not need to withstand attractive forces.

A further advantage of the axially-symmetric construction is that the magnetic fields of the machine, whether generated as a result of electrical currents in conductors or produced by permanent magnets, can be contained within an outer steel case of the actuator. However they are generated, the magnetic fields can intersect the electrical coils of the machine with a high degree of efficiency.

Yet another advantage of the axially-symmetric construction is that, by utilising a cylindrical stator it is possible to form a sliding seal between the stator and the armature, which then allows of the possibility of creating a gas spring between the stator and armature by closing one end of the stator. Such an arrangement is described in more detail in the Applicant's international application PCT/GB98/02823.

All these known linear actuators are constructed and designed to apply a force between machine components connected or mechanically linked to the stator and armature, for which purpose these have a configuration which permits such connection. However, there are certain mechanical systems in which it is not required to connect a moving element physically to a drive element. In such circumstances the armature of the actuator does not have to have a continuous direct connection to the external environment. For example, it may be required for an element to be repeatedly driven to reciprocate along a guide member so as to deliver energy at the ends of its stroke when it changes direction. A road breaker or so-called "pneumatic hammer" works in this way by the alternate application of opposite forces by directing pressure fluid alternately into opposite chambers of a pneumatic cylinder with a flutter valve.

If the moving element has significant inertia, against which the external "stator" of the machine is designed to experience a reaction, a controlled vibration can be applied: this may be used for example in association with earth-moving machinery. As a third example, the motion of the an unrestricted piston might be used to vary the total enclosed volume and/or pressure of a fluid system to which the piston chamber is connected. Such a machine might be used as a fluid pump, to dispense metered fluid, to vary the pressure in a sensory pad or to form part of a sensitive and precise fluid pressure suspension system.

Examples of such devices are disclosed in patent specifications U.S. Pat. No. 4,965,864, GB 6 452 81 and GB 2 017 420.

Specification U.S. Pat. No. 4,965,864 discloses a pump in which there is a hollow cylindrical stator surrounded by a sequence of coils and an armature which acts as the pump piston. The armature is a series of magnets arranged to produce a succession of radially oriented magnetic fields of the same sense. The coils are energised sequentially to cause the armature to oscillate within the stator and perform the pumping action.

Specification GB 6 452 81 discloses a solenoid device which works on the variable reluctance principle. The device consists of a plurality of sequential coils surrounding a hollow cylindrical chamber. A magnetic armature has an axial length such that it overlaps two adjacent coils. Successive energising of the two adjacent coils overlapped by the armature causes a linear motion of the armature, either in a single direction or Specification GB 6 452 81 discloses a solenoid device which works on the variable reluctance principle. The device consists of a plurality of sequential coils surrounding a hollow cylindrical chamber. A magnetic armature has an axial length such that it overlaps two adjacent coils. Successive energising of the two adjacent coils overlapped by the armature causes a linear motion of the armature, either in a single direction or in a reciprocating motion, as desired.

Specification GB 2 017 420 again discloses a electromagnetic pump which has an armature which acts as an piston and which is caused to reciprocate within a stator chamber by electromagnetic interaction between the armature and a winding surrounding the stator and which produces a reciprocating magnetic field which causes corresponding movement in the armature.

In this case the armature is made of an electrically conducting but non-magnetic material such as aluminum and the device acts, inefficiently, as a reciprocating linear induction motor.

The present invention seeks to provide a linear actuator comprising a stator and an armature in which the armature is not attached to an output member which protrudes from the stator, such as the actuator arm or piston rod of known such actuators. That is to say, the armature of this invention is a piston that is free (or substantially free) to move within the stator volume. As used in this specification the term "free piston" will be understood to mean a member movable within a working volume without having a force-transmitting member such as a piston rod.

According to one aspect of the present invention, therefore, the present invention provides electromagnetic apparatus for producing an axially directed force comprising a stator having a plurality of axially spaced coils around a working volume within which an armature in the form of a free piston is axially displaceable, the armature having means for producing a magnetic field a substantially radially directed part of which intersects at least some of the coils of the stator such that a resultant axially directed force is generated when a current flows in the coils.

Preferably the physical parameters of the device are so chosen that the electrical coils may be connected to an electronic drive unit for controlling the phase, frequency or amplitude of the current in the coils so as to cause the desired axially-directed electromagnetic force to be created between the armature and the stator.

In one embodiment the armature and the stator are of circular cross section. This makes it easy for the outer surface of the armature to be sealed with respect to the internal surface of the stator, so as to prevent or at least restrict fluid flow between the volumes on either side of the piston.

Means may be provided for sensing the position of the piston so as to optimise the configuration of the currents supplied to the coils by the electronic drive unit.

The electronic drive unit may also be arranged to produce a signal representative of the current supplied to the actuator, the integral of such signal being used to control the pressure of a gas supply to at least to one side of a sealed armature.

Various embodiments of the present invention will now be more particularly described, by way of example, with reference to the accompanying drawings, in which.

Figure 1:
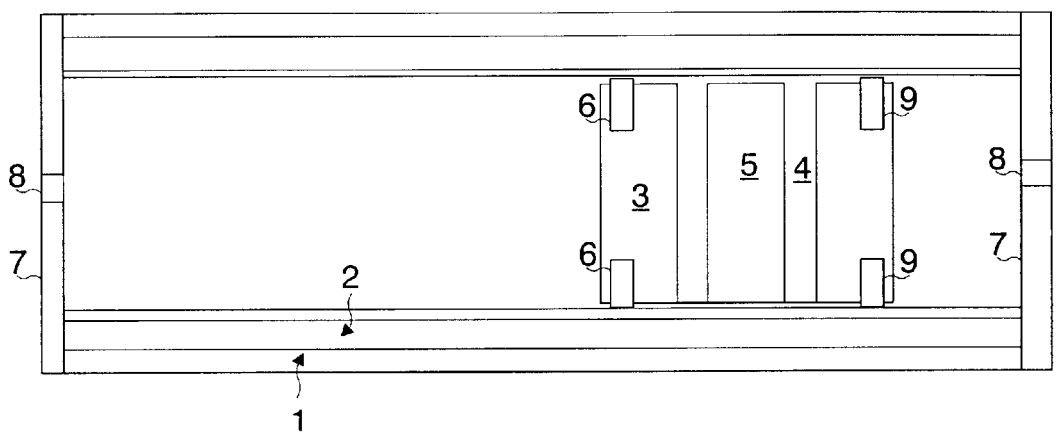
FIG. 1 is a schematic axial sectional view of a free piston actuator formed as a first embodiment of the present invention.

FIG. 1 shows a particular form of the device in which the armature(piston) is required to be sealed to the inner surface of the armature tube. In this example the stator 1 carries an assembly of coils 2 extending circumferentially around the axis of the cylinder. The piston 3, moving on bearings 9 and seals 6, carries an arrangement of magnets 4 and polepieces 5 to produce a magnetic field alternating in polarity along the axis of the cylinder. The ends of the device include closures 7, in which, in this embodiment, there are provided fluid passages 8 so as to allow fluid to be moved by the action of the piston 3, if that motion is significant in relation to the enclosed volume.

Figure 2:
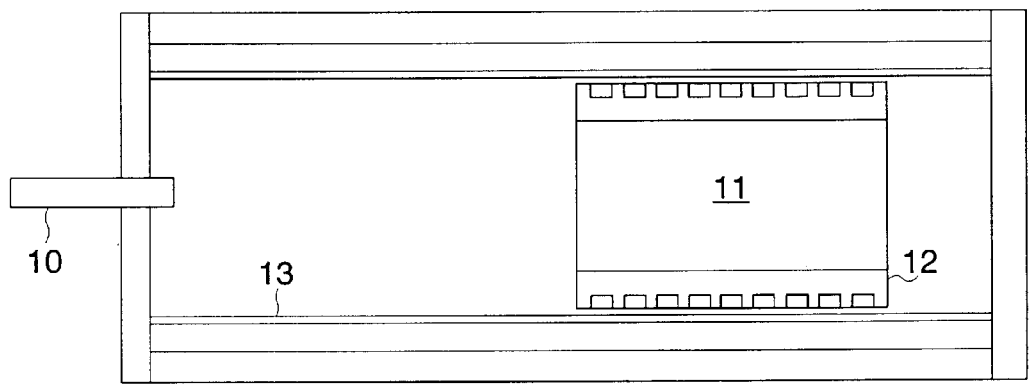
FIG. 2 is an axial sectional view of an alternative embodiment having induction drive and a working tool.

FIG. 2 shows an example of a free-piston actuator used to deliver repeated blows to a tool 10. The armature of this device consists of a hardened core 11 which may also contain lead to increase its mass. The core is keyed to an outer magnetic steel cylinder 12 which carries a series of slots in which are copper rings 13.

The coil assembly 2 is energised to produce an alternating magnetic field that travels along the axis of the piston. This induces currents in the armature rings 13 so as to produce a second alternating magnetic field, whose interaction with the first field accelerates the piston. It is necessary for the piston to be fitted with simple bearing rings (not shown, but similar to those of 9 in FIG. 1). Nevertheless, it should be noted that the inductive forces that accelerate the piston also act to hold it away from the sides of the cylinder when in motion; such bearings do not therefore need to be of high quality.

Arrangements (not shown) are made to allow air or other gas within the cylinder 12 to pass freely between the opposing ends of the device shown in FIG. 2, so as not to impede the motion of the piston.

It will be understood that the electromagnetic configuration of the invention is not restricted to the use of permanent magnets and an ironless stator assembly, as shown by way of example in FIG. 1, or to the use of an induction technique as shown by way of example in FIG. 2. The armature or piston may, with advantage in certain conditions, use a variable-reluctance drive technique and/or the stator may have slots housing the coils.

Figure 3:
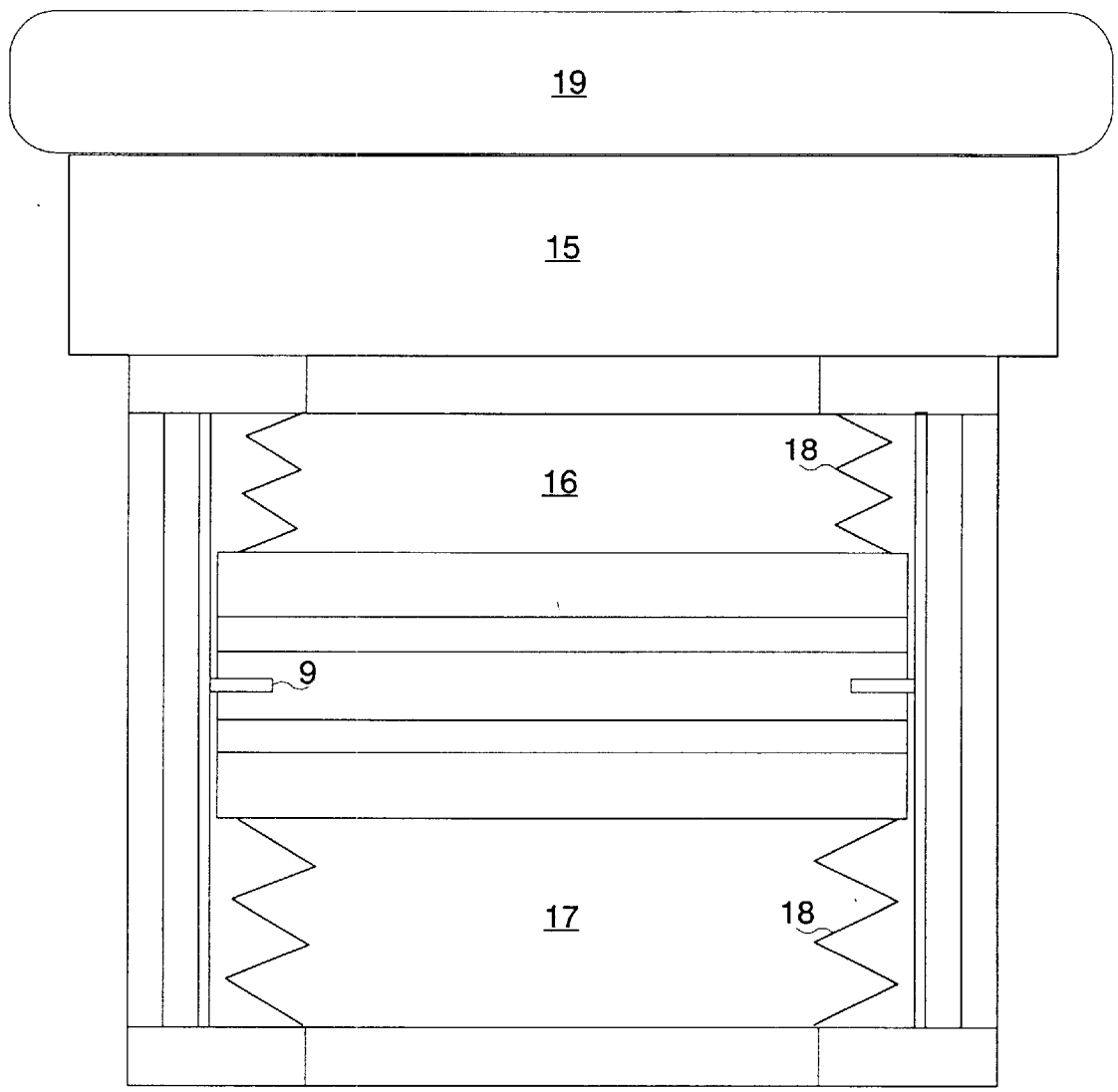
FIG. 3 is a schematic axial sectional view of an alternative embodiment utilised in a pressure pad drive system.

FIG. 3 shows a particular form of the actuator in relation to a pressure pad 15 carrying a load 19. The principal parts of the actuator device are similar to those described in FIG. 1.

In this example the piston is shown as being provided with bearings 9 but to be sealed to the pressure pad 15 and to the source of pressurising fluid by bellows 18.

Figure 4:
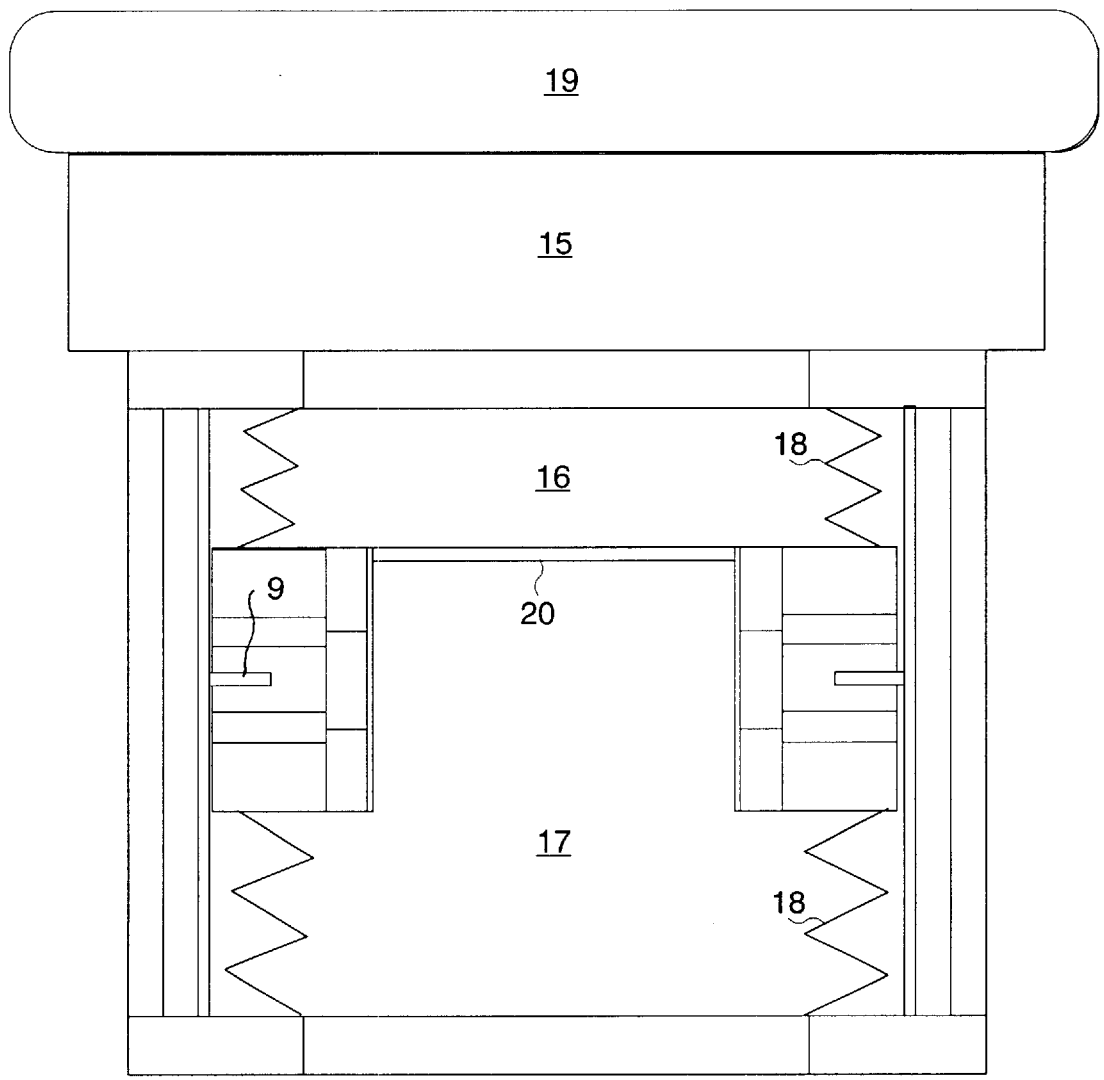
FIG. 4 is an axial sectional view of a further alternative embodiment employing ring magnets.

FIG. 4 shows a modified form of the device illustrated in FIG. 3, in that the axially-alternate magnetic field of the piston is produced by plane rings of magnetic material instead of discs. This technique allows the device to be of lightweight construction whilst applying force to a diaphragm 20 having an area larger than that of the magnets.

As described in the Applicant's International Patent Application PCT/GB98/02823 the time integral of the current consumed by the device is continuously computed and the fluid pressure in the volume 17 beneath the piston is frequently adjusted to bring this integral to zero. This control technique ensures that the mean values of the pressures above and below the piston are equalised.

Position-sensing means (not shown) are also utilised by the control system to ensure that the median position of the piston is in the central region of the actuator.

It will be understood that the use of a bellows to replace the piston seal removes the constraint that the piston and the internal surface of the armature should be of circular cross-section.

It will be further understood that the principles of this invention are not compromised by the use of springs or equivalent compliances to provide a mechanical bias to the position of the piston in the absence of electrical power and that such compliant biasing devices may utilise permanent magnetic fields. In embodiments in which the armature is intended, in use, to reciprocate at high frequency the air trapped in the stator cylinder on either side of the pistons may act as a gas spring to cushion the impact at each end of its stroke. The piston/cylinder seal does not have to be very airtight in that the periodic motion may have a sufficiently high frequency for leakage effect to be minimal.

What is claimed is:

1. An electromagnetic apparatus comprising:

a stator;

said stator having closed ends defining a working volume;

a plurality of coils in said stator;

a free piston axially movable within said stator;

means for applying an electrical current to said plurality of coils in a manner effective for oscillating said piston within said working volume;

said piston including at least one unitary annular conductive member; and said electrical currents being effective to induce magnetic fields in said conductive member in a sense effective to interact with magnetic fields of said plurality of coils thereby to generate a resultant axial force which urges said piston in axial motion in said stator.

2. An apparatus according to claim 1, wherein said armature includes a plurality of unitary annular conductors attached to a common ferromagnetic body.

3. An apparatus according to claim 1, wherein:

said working volume includes at least one end stop in said working volume;

said axial motion includes sufficient motion to impact said end stop, whereby a kinetic energy of said piston is deliverable to an external object.

4. An apparatus according to claim 3, further comprising:

a working tool associated with said stator; and said working tool receiving said kinetic energy for delivery to said external object.

5. An apparatus according to claim 1, wherein:

said working volume includes at least one opening;

said at least one opening permitting a transfer of fluid and from one side to another thereof upon displacement of said piston within said working volume.

6. An apparatus according to claim 1, further comprising:

a flexible member enclosing said working volume to form a closed volume having variable dimensions;

means for communicating a fluid within said closed volume with a second working volume outside said stator;

a pressure pad in physical contact with said second working volume; and said pressure pad being effective for varying a pressure exerted over at least a limited part of an area of said second working volume.

7. An electromagnetic apparatus comprising:

a stator;

said stator having closed ends defining a working volume;

a plurality of coils in said stator;

a free piston axially movable within said stator;

means for applying an electrical current to said plurality of coils in a manner effective for oscillating said piston within said working volume;

said piston including a plurality of permanent magnets;

said electrical currents being effective to induce magnetic fields which interact with magnetic fields of said plurality of magnets in a sense effective to generate a resultant axial force which urges said piston in axial motion in said stator;

said plurality of permanent magnets being oriented with their direction of magnetization parallel to an axis of said stator; and pole pieces at each end of said piston directing magnetic fields produced by said magnets radially from circumferential faces of said pole pieces whereby to intersect said coils.

8. Apparatus according to claim 7, wherein directions of magnetization of adjacent magnets is in opposite directions.

* * * * *